United States Patent [19]

Doi et al.

[11] Patent Number: 5,537,520
[45] Date of Patent: Jul. 16, 1996

[54] METHOD AND SYSTEM FOR DISPLAYING A THREE DIMENSIONAL OBJECT

[75] Inventors: Akio Doi, Machida; Akio Koide, Kawasaki, both of Japan

[73] Assignee: International Business Machines Corporation, Armonk, N.Y.

[21] Appl. No.: 120,711

[22] Filed: Sep. 13, 1993

Related U.S. Application Data

[63] Continuation of Ser. No. 631,122, Dec. 20, 1990, abandoned.

[30] Foreign Application Priority Data

Dec. 12, 1989 [JP] Japan ................................ 1-338897

[51] Int. Cl.$^6$ ............................................... G06F 15/00
[52] U.S. Cl. ............................................ 395/122; 395/121
[58] Field of Search .................................. 395/118–125

[56] References Cited

U.S. PATENT DOCUMENTS

| | | | |
|---|---|---|---|
| 4,710,876 | 12/1987 | Cline et al. | 395/124 |
| 4,719,585 | 1/1988 | Cline et al. | 395/124 |
| 4,821,210 | 4/1989 | Rumbaugh | 395/124 |

FOREIGN PATENT DOCUMENTS 60198690 of 0000 Japan.

OTHER PUBLICATIONS

"A Novel Triangular Method of Equi-Valued Surface Based on Tetrahedral Grids", TRL Research Report TR 87–1017, Dec. 14, 1987, Tokyo Research Lab, IBM Japan Ltd, A. Koide et al.

"Polyhedral Approximation Approach to Molecular Orbital Graphics", Journal of Molecular Graphics, vol. 4, No. 3, Sep. 1986, pp. 149–159, A. Koide et al.

*Primary Examiner*—Mark R. Powell
*Assistant Examiner*—B. Huynh
*Attorney, Agent, or Firm*—Mark S. Walker

[57] ABSTRACT

A method and system for displaying a three-dimensional object without requiring depth sorting of polygons or z-buffer calculation. The three-dimensional space is divided into rectangular parallelepipeds and tetrahedrons. A determination of the depth order of the rectangular parallelepipeds and tetrahedrons is made based on a view vector. The rectangles and tetrahedrons are then processed in order of depth from the furthest from the view point to the nearest. As each tetrahedron is processed, geometric data of a polygon containing the iso-valued surface is determined, the intensity of illumination calculated and the polygon data transferred to the display apparatus for display. The method and system of the present invention avoid the need for large memories to store intermediate data.

14 Claims, 13 Drawing Sheets

METHOD AND SYSTEM FOR DISPLAYING A THREE DIMENSIONAL OBJECT

This is a continuation of application Ser. No. 07/631,122 filed Dec. 20, 1990, now abandoned.

BACKGROUND OF THE INVENTION

A. Field of the Invention

The present invention relates to a method and an apparatus for displaying a 3D object such as an equi-valued surface (iso-surface) on the basis of the graphics data of polygons, and more particularly to a method and a system for the execution of types of 3D object processing such as hidden surface removal that are done in order of the depth of polygons, without performing depth calculations for polygons or polygon sorting.

B. Prior Art

A depth sorting algorithm and a z-buffer algorithm are typical examples of conventional methods for approximating a 3D object such as equi-valued surface to polygons and performing hidden surface processing on the polygonal data in order of depth. The depth sorting algorithm requires depth calculations for all the polygons and sorts them in order of depth, so there is a problem that a long time is required to sort the large number of polygons making up a complex object. In contrast, the z-buffer algorithm needs no sorting, but it requires a large amount of memory to store the depth of each pixel, and cannot display transparent objects. Moreover, depth calculation must be performed for each polygon.

Japanese Published Unexamined Patent Application No. 60-198690 discloses a method for improving depth-sorting algorithms. In accordance with this method, a space that contains polygons is divided into a plurality of blocks after polygonal data are generated and stored. Then, after the position of a view point has been determined, the depth of each block from the view point is calculated. A complicated calculation using a graph where the blocks are represented by nodes and their boundaries by branches is used for the depth calculations. The blocks are sorted in order of the calculated depths. In each block, on the other hand, the depths of polygons are calculated, and the polygons are sorted in order of depth. When an object is displayed, polygonal data are taken out sequentially from the block furthest from the view point. Polygons contained in the same block are displayed in order of depth. This reduction in the number of polygons to be sorted shortens the sorting process.

However, it is not a thorough solution in that depth calculation is required for all the polygons, and polygon sorting is required even if depth calculation is carried out for each block. In addition, the method for determining the depth order of the blocks is complicated, which causes a new problem that the required processing time and memory size are not negligible.

SUMMARY OF THE INVENTION

Accordingly, an objective of the present invention is to provide a method and a system for hidden surface processing in order of the depth of polygons without depth calculations or sorting for the polygons.

In order to achieve this objective, in a system wherein a three-dimensional space is virtually divided into a plurality of elements arranged according to predetermined directions, wherein graphics data of one or more polygons may be generated in each element, and a 3D object is displayed on the basis of the generated graphics data of polygons, the invented method for displaying a 3D object comprises, as shown in FIG. 1:

(a) Step 10: providing a view point and a reference point and generating data for a view vector connecting the view point and the reference point, (b) Step 12: determining the depth order of said elements on the basis of the view vector data and vector data on the arrangement directions of the elements, and (c) Step 14: transferring the generated graphics data of polygons to a display apparatus in order of the depth of said elements.

If each of said elements is virtually divided into an equal number of sub-elements, the positional relation of sub-elements in one element is common to all the elements, the graphics data of at most one polygon are generated in each sub-element, and the 3D object is displayed on the basis of the generated graphics data of polygons, then in step 12, the depth order of sub-elements in one element (and common to all the elements) is determined on the basis of the position data of the sub-elements contained in the element and the view point, and in step 14, the generated graphics data of polygons are transferred to a display apparatus in order of the depth of said elements and of the sub-elements in one element.

DETAILED DESCRIPTION OF THE PREFERRED EMBODIMENT

D1. Polyhedral approximation by the tetrahedral grid method

Polyhedral approximation by a tetrahedral grid method is first explained, because it is used in the embodiment of the present invention given later.

Figure 1:
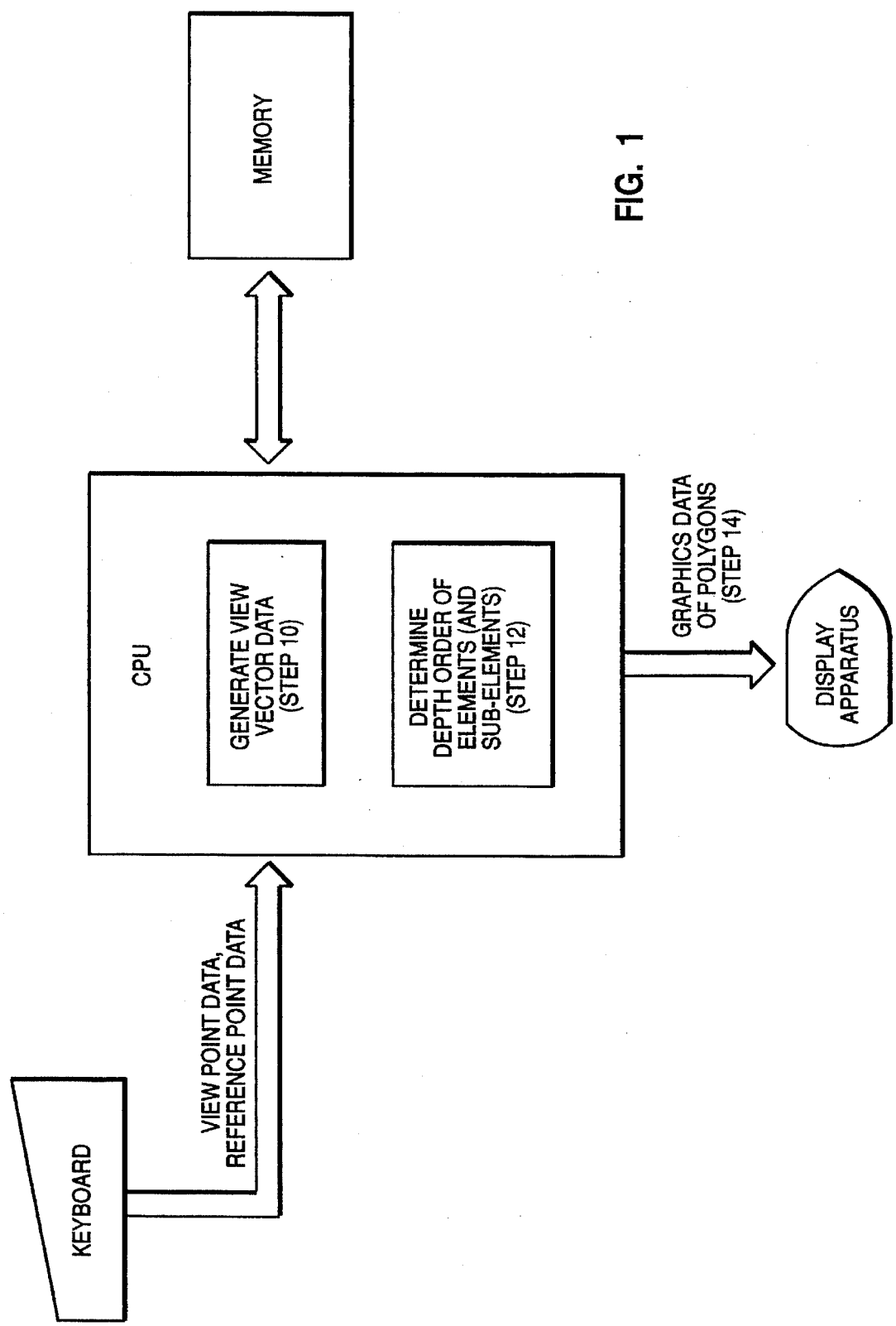
FIG. 1 is a schematic diagram illustrating the outline of the process steps of the present invention.
Figure 2:
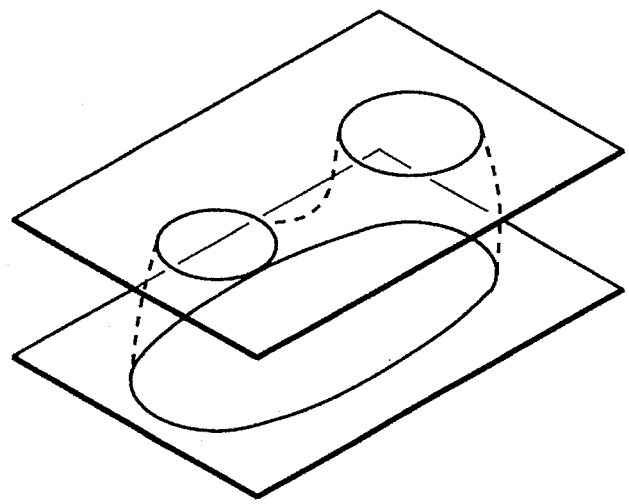
FIG. 2 shows an example of surfaces that are difficult to display by methods other than the tetrahedral grid method.

Measured data such as pressure, temperature, density, potential, and the results of a large-scale simulation are outputted as numerical data at grid points or parameter sets defining functions. To help humans to understand the outputs more easily, it has become important to visualize them. As contour lines are used in visualizing two-dimensional data and functions, equi-valued surfaces are often used in visualizing three-dimensional data and functions. Here, an equi-valued surface is defined as a set of points (x,y,z) that satisfies the equation $$F(x,y,z)-C=0 \qquad (1)$$

where F is a function defined in a three-dimensional domain and C is a constant. Conventionally, the graphics data of an equi-valued surface are generated as a set of contour lines in a number of cross sections. In order to perform surface display, therefore, the contour lines must be connected to each other after they have been generated. Therefore, if the topological nature varies with the adjacent contour lines as shown in FIG. 2, the method for connecting them is necessarily complex. In addition, no equi-valued surface can be displayed without obtaining the equation of the function F.

The inventors have proposed polyhedral approximation by a tetrahedral grid method in (I) Akio Koide, Akio Doi, and Koichi Kajioka, "Polyhedral Approximation Approach to Molecular Orbital Graphics," Journal of Molecular Graphics, Volume 4 Number 3, September 1986, pp. 149 to 159, and (II) Akio Koide and Akio Doi, "A Novel Triangulation Method of Equi-Valued Surface Based on Tetrahedral Grids," TRL Research Report TR87–1017, Dec. 14, 1987, issued by Tokyo Research Laboratory, IBM Japan, Ltd. An outline is given below.

In the tetrahedral grid method, grid points are defined in a three-dimensional space and graphics data are generated on the basis of the scalar values provided to the grid points by an experiment or by calculating the value of the function F(i,j,k) at the grid points. Hereinafter, an explanation is provided for the case in which a function F and a constant C are given.

Figure 3:
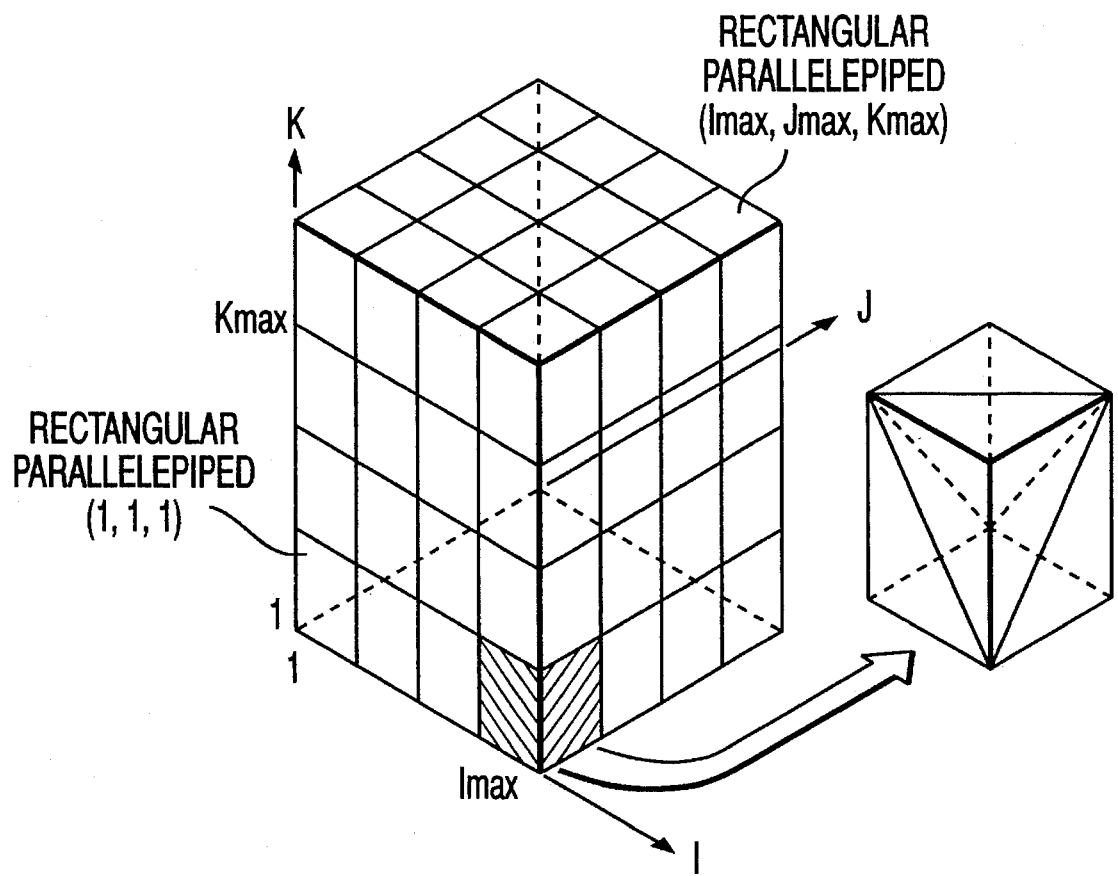
FIG. 3 illustrates the division of a space into rectangular parallelepipeds as well as the division of a rectangular parallelepiped into tetrahedrons.

First, as shown in FIG. 3, the grid space is divided into rectangular parallelepipeds whose vertices are grid points, and each rectangular parallelepiped is further divided into tetrahedrons whose vertices are grid points. Then, a list for associating rectangular parallelepipeds with the tetrahedrons contained in those rectangular parallelepipeds is generated and stored in one area of memory, while a list for associating the tetrahedrons with the vertices defining those tetrahedrons and the position data of the vertices is generated and stored in another area of memory. Hereinafter, the former is referred to as a rectangular parallelepiped-tetrahedron list, and the latter as a tetrahedron-vertex list. Here, the grid points are represented by (i,j,k) (i=1, Nx, j=1, Ny, k=1, Nz; Nx, Ny and Nz are the number of grids in the x-, y-, and z-directions, respectively). A rectangular parallelepiped (i,j, k) (i=1, Imax, j=1, Jmax, k=1, Kmax; Imax, Jmax, and Kmax are the number of rectangular parallelepipeds in the I-, J-, and K-directions, respectively), denotes a rectangular parallelepiped whose vertices are (i,j,k), (i+1,j,k), (i,j+1,k), (i,j,k+1), (i+1,j+1,k), (i+1,j,k+1), (i,j+1,k+1), and (i+1,j+1, k+1).

Figure 4:
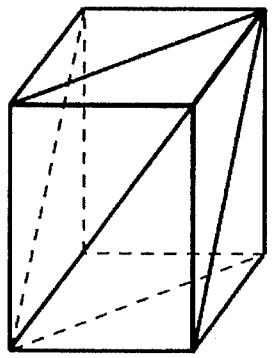
FIG. 4 illustrates the division of a rectangular parallelepiped into six tetrahedrons.
Figure 5:
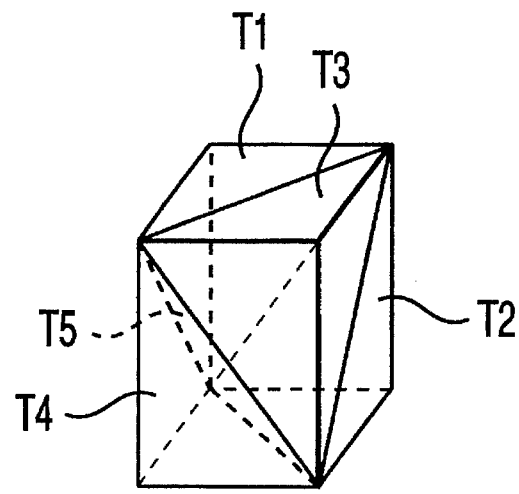
FIG. 5 illustrates the division of a rectangular parallelepiped into five tetrahedrons.

FIG. 4 shows the case in which each rectangular parallelepiped is divided into six tetrahedrons, and FIG. 5 shows the case in which each rectangular parallelepiped is divided into five tetrahedrons.

If divided into five tetrahedrons, tetrahedrons T1 to T5 are each represented by four grid points, as shown in Table 1.

TABLE 1

| | |
|---|---|
| T1 | (i',j',k'), (i",j',k') |
| | (i",j",k'), (i",j',k") |
| T2 | (i',j',k'), (i',j",k') |
| | (i",j",k'), (i",j",k") |
| T3 | (i',j',k'), (i',j",k") |
| | (i',j',k"), (i',j",k") |
| T4 | (i",j',k"), (i',j',k") |
| | (i",j",k'), (i",j",k') |
| T5 | (i',j',k'), (i",j",k') |
| | (i',j",k"), (i",j',k") |

Here, for integers i, j and k, $i'=2[(i+1)/2]$, $j'=2[(j+1)/2]$, $k'=2[(k+1)/2]$, $i''=2i+1-i'$, $j''=2j+1-j'$, and $k''=2k+1-k'$, where [ ] is a Gaussian symbol which shows that numerals after the decimal point have been discarded.

Then, the vertex data of the polygons approximating the equi-valued surface are obtained by linear interpolation on the edges of each tetrahedron. First, F(i,j,k)-C is calculated for each vertex of the tetrahedrons and its sign is obtained. Although fifteen cases are classifiable according to the signs of four vertices of one tetrahedron, as shown in Table 2, geometric data of a polygon are generated only for cases 7 to 13. The numbers in the columns of "–", "0" and "+" in Table 2 are the numbers of vertices for which F-C has the corresponding sign.

TABLE 2

| Case | – | 0 | + | Generable polygon |
|---|---|---|---|---|
| 1 | 4 | 0 | 0 | None |
| 2 | 0 | 0 | 4 | None |
| 3 | 3 | 1 | 0 | None |
| 4 | 0 | 1 | 3 | None |
| 5 | 2 | 2 | 0 | None |
| 6 | 0 | 2 | 2 | None |
| 7 | 3 | 0 | 1 | One Triangle |
| 8 | 1 | 0 | 3 | One Tetragon |
| 9 | 2 | 0 | 2 | One Triangle |
| 10 | 2 | 1 | 1 | One Triangle |
| 11 | 1 | 1 | 2 | One Triangle |
| 12 | 1 | 2 | 1 | One Triangle |
| 13 | 1 | 3 | 0 | One Triangle |
| 14 | 0 | 3 | 1 | One Triangle |
| 15 | 0 | 4 | 0 | Four Triangles |

It is determined that, in cases 7 to 13, the tetrahedron contains a polygon approximating the equi-valued surface. The vertices of the polygons are located on the edges of the tetrahedrons, on both ends of which the signs of F-C are different. The coordinates (x,y,z) of the vertex are obtained from the function values f1=f(x1,y1,z1) and f2=f(x2,y2,z2) at both ends of the edge, as follows:

$$t = (f1 - C)/(f1 - f2) \qquad (2)$$
$$x = x1 + t(x2 - x1)$$
$$y = y1 + t(y2 - y1)$$
$$z = z1 + t(z2 - z1)$$

Figure 6:
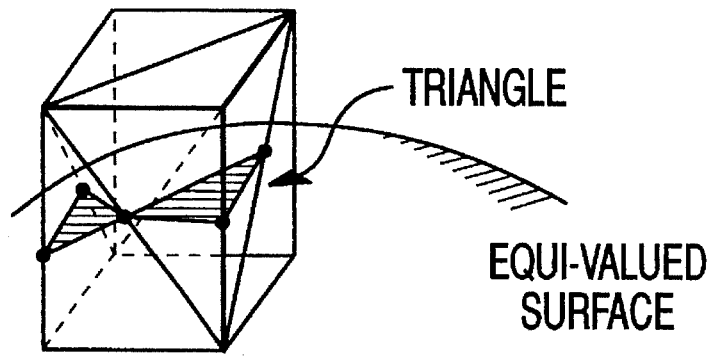
FIG. 6 illustrates the formation of polygons by the tetrahedral grid method.
Figure 7:
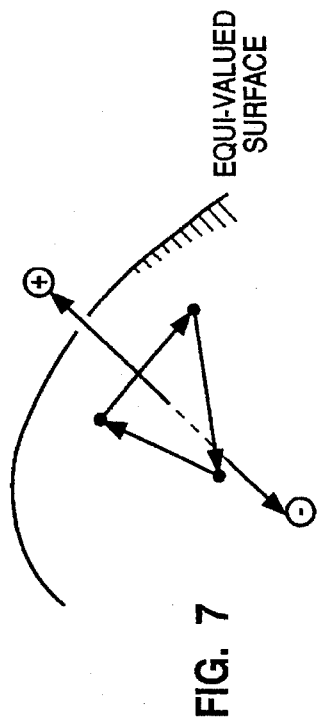
FIG. 7 illustrates the orientation of a polygon.

Polygons are generated by dividing a spatial domain into rectangular parallelepipeds whose vertices are grid points, subdividing the rectangular parallelepipeds into tetrahedrons, and applying linear interpolation inside each tetrahedron. They are connected to each other automatically and form a polyhedral approximation of the equi-valued surface. The concept is shown in FIG. 6.

In order to calculate the intensity of illumination, the orientations of the polygons (triangles) are used as the surface normals. The edges of the generated polygons (triangles) are reordered so that the clockwise direction is positive with respect to the normal vectors of the polygons. This orientation process can be rapidly executed by using a stack. The method is detailed in the above-mentioned reference (II), so no explanation is given here.

If the data is available on the color of the equi-valued surface to be displayed, which can be arbitrarily defined, the data on the calculated intensity, and the geometric data of a polygon are sent to a display apparatus, and that polygon can be displayed. Hereinafter, the graphics data required to display a polygon are also referred to simply as polygonal data.

Figure 8:
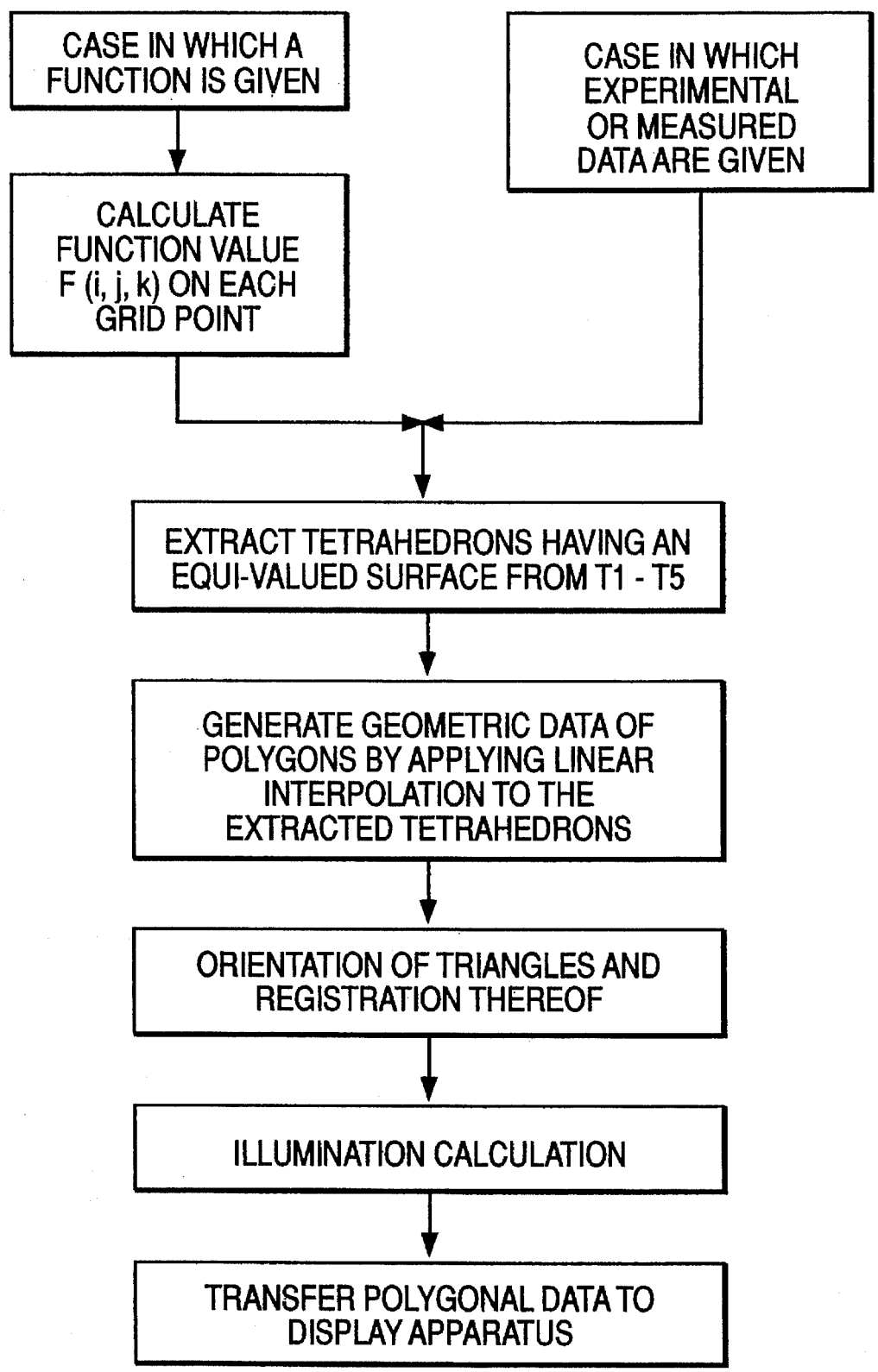
FIG. 8 is a flowchart of the process in the tetrahedral grid method.

FIG. 8 summarizes the process flow in the tetrahedral grid method described above.

According to the tetrahedral grid method, graphics data can be generated relatively easily, even for a surface of a complex shape like that shown in FIG. 2. Moreover, if a scalar value is provided for each grid point beforehand, provision of the scalar value of the equi-valued surface to be displayed allows the generation of graphics data even though the function of that surface is not known.

D2. Outline of hidden surface processing

Figure 9:
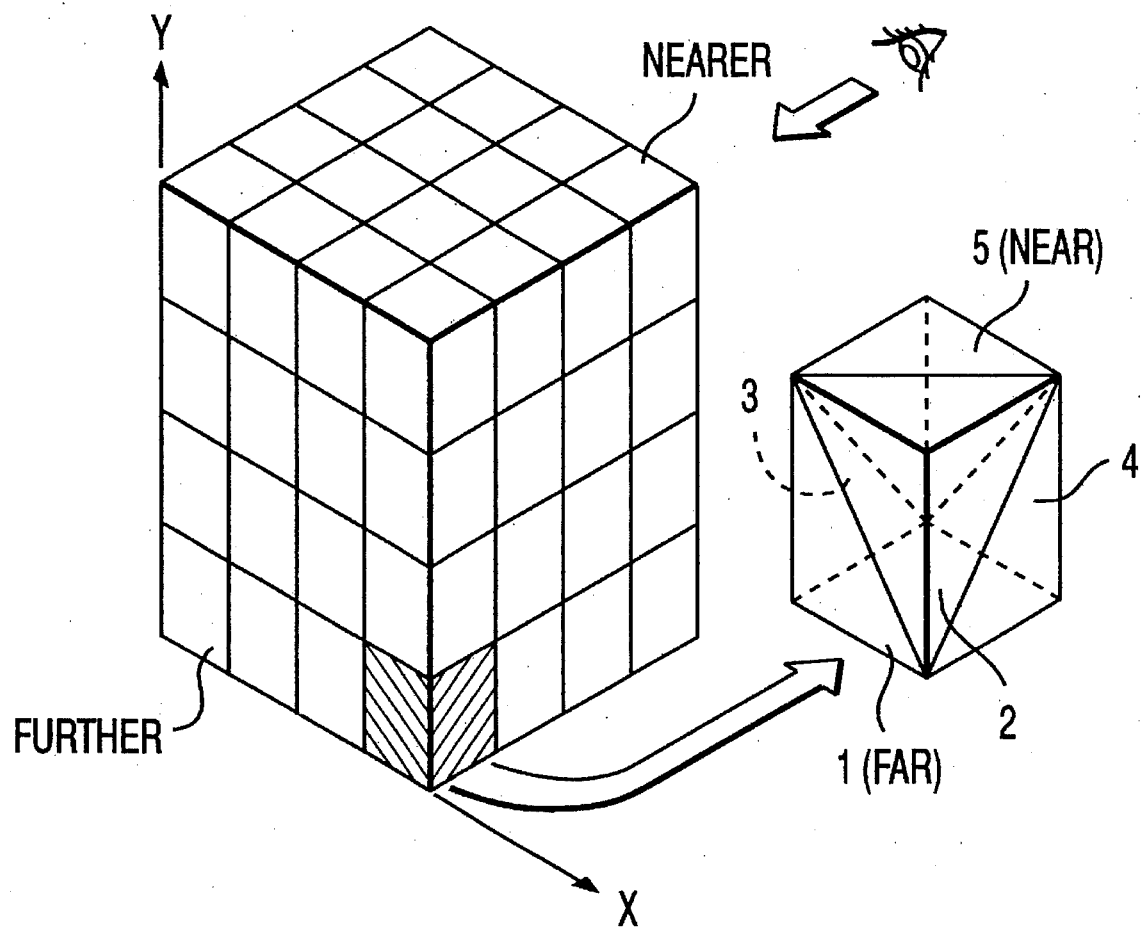
FIG. 9 illustrates the space-dividing step of the tetrahedral grid method.

As described above, in the tetrahedral grid method, a space is regularly divided into rectangular parallelepipeds and tetrahedrons, and at most one polygon is contained in one tetrahedron. In such circumstances, if the positions of a view point and a reference point are determined and a view vector is determined accordingly, the depth order of the rectangular parallelepipeds and tetrahedrons as seen from the view point is easily determined, as shown in FIG. 9. If data on polygons are transferred to a display apparatus in order of decreasing distance from the view point, hidden surface processing in order of the depth of polygons is automatically performed without depth calculations or sorting for the polygons. An example of the depth order to be provided to tetrahedrons is shown by the numbers in FIG. 9.

Conventionally, hidden surface processing is executed by applying a depth sorting algorithm or z-buffer algorithm even to the polygons obtained by the tetrahedral grid method. This does not solve the above identified problems. The present invention offers a solution.

Figure 10:
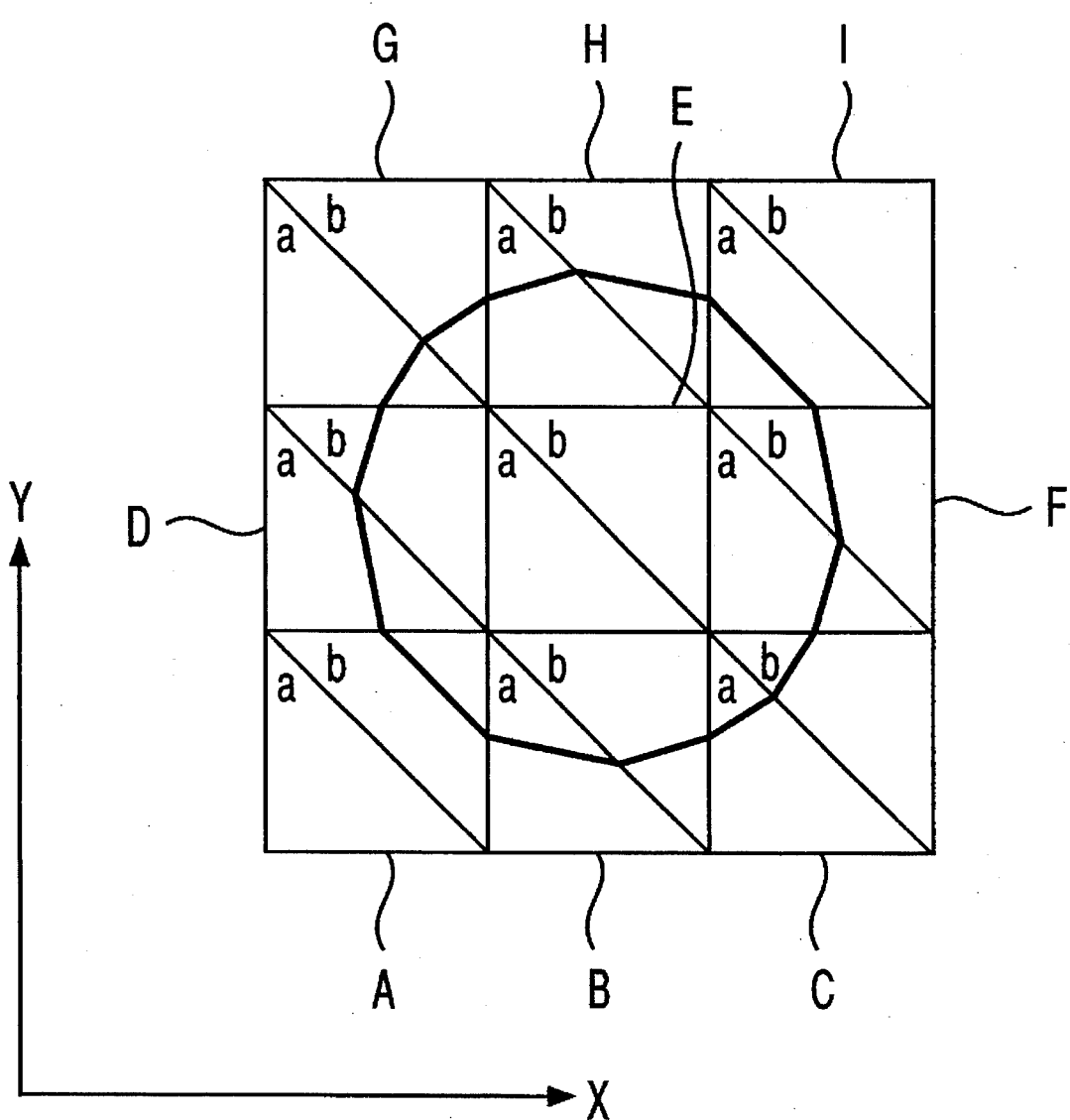
FIGS. 10 to 13 illustrate the outline of 3D object processing according to the present invention.

Processes for determining the depth order of rectangular parallelepipeds and tetrahedrons and for hidden surface removal are explained with reference to FIGS. 10-13. The discussion refers to a two-dimensional space for ease of understanding. Here, the space is divided into rectangles A to I, which correspond to rectangular parallelepipeds in a three-dimensional space, as shown in FIG. 10. One arrangement direction of the rectangles is parallel to the X-axis of an orthogonal coordinate system, and the other arrangement direction is parallel to the Y-axis of the orthogonal coordinate system. Each rectangle is divided into two triangles, which correspond to tetrahedrons in a three-dimensional space. The positional relation between the triangles is common to all the rectangles. A triangle at the origin side of the orthogonal coordinate system is designated as "a," and a triangle at the opposite side is designated as "b." FIG. 10 also shows polygons approximating a circle, which correspond to a sphere in a three-dimensional space. Since the space is two-dimensional, polygons correspond to line segments.

In this example, the unit vectors of the arrangement directions of the rectangles are $X=(1,0)$ and $Y=(0,1)$. The depth order of rectangles is obtained from the inner product of the view vector V and the vector X and that of the view vector V and the vector Y. Tables 3 and 4 show the criteria for determining the depth order of rectangular parallelepipeds from the inner products V·X and V·Y.

TABLE 3

| | Depth order in X-direction |
|---|---|
| V · X ≧ 0 | C → A |
| V · X < 0 | A → C |

TABLE 4

| | Depth order in Y-direction |
|---|---|
| V · Y ≧ 0 | G → A |
| V · Y < 0 | A → G |

The above tables show that A is the furthest and C is the nearest of rectangles A to C, D is the furthest and F is the nearest of rectangles D to F, and G is the furthest and I is the nearest of rectangles G to I, if V.X<0.

Figure 11:
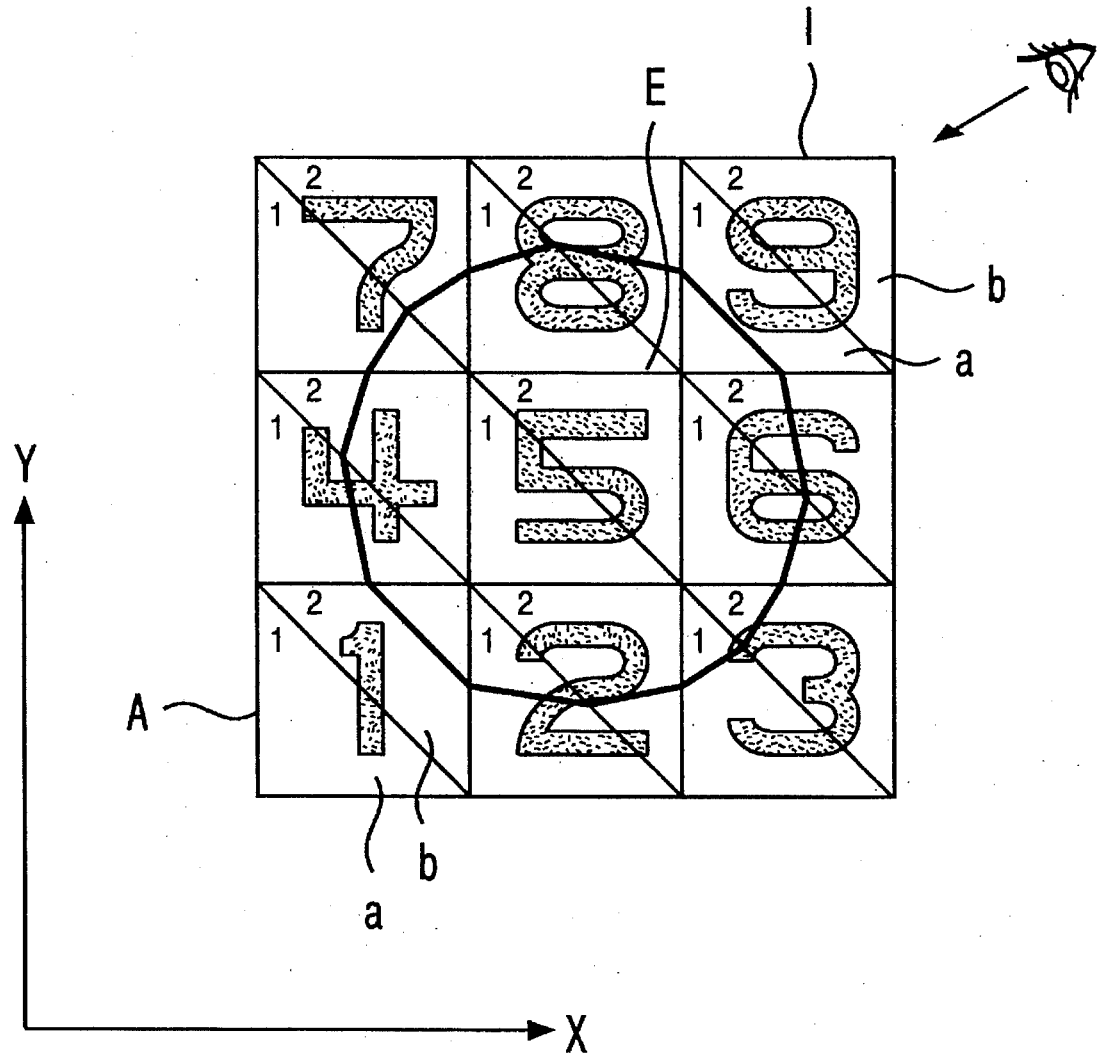
Figure 12:
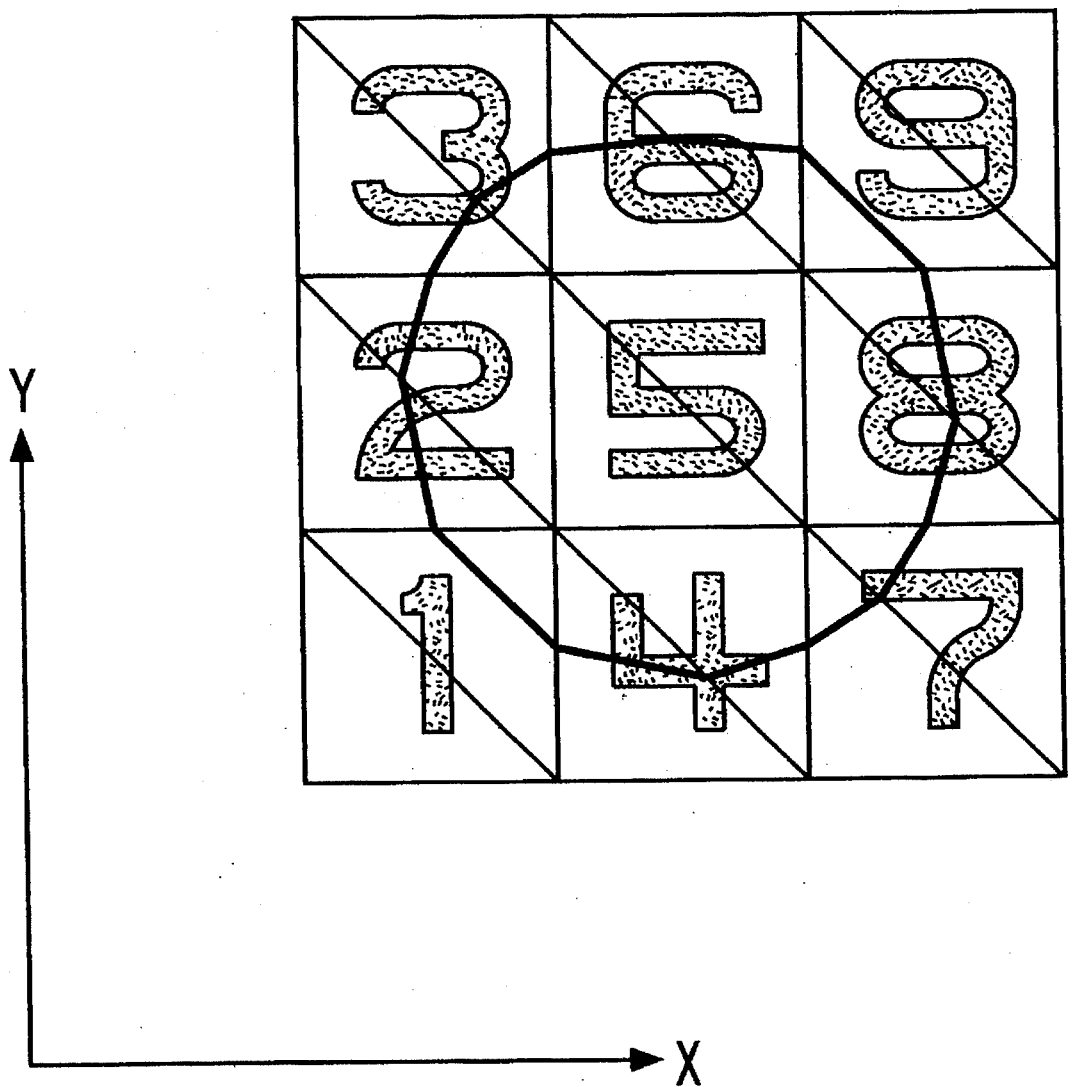

FIG. 11 shows the case in which the view vector is V=(−2, −1). Since the inner product V.X=−2<0 and V.Y=−1<0, the depth order in the Y-direction is A → C and the depth order in the Y-direction is A→ G. Accordingly, the depth order is shown by large numbers 1 to 9, as in FIG. 11. Attention is given to rectangle E, for instance. After the position data of the centroids of triangles "a" and "b" contained there are obtained, the distance from the view point is obtained for each of the centroids. It is determined that triangle "a" is further than triangle "b" because the distance from the view point to the centroid is further for triangle "a." The depth order of triangles in one rectangle is common to all the rectangles. This is shown by the small numbers in FIG. 11. Accordingly, if polygonal data inside triangles are generated in the order A-a to I-b and transferred to a display apparatus in order of generation, hidden surface removal is automatically performed. That is, in the example of FIG. 11, polygonal data are generated first in triangle A-b and transferred to the display apparatus, while polygonal data are generated last in triangle I-a and transferred to the display apparatus. Thus, polygons are displayed in order of decreasing distance from the view point. Parenthetically, a depth order like that shown in FIG. 12 may also be provided to rectangles.

Figure 13:
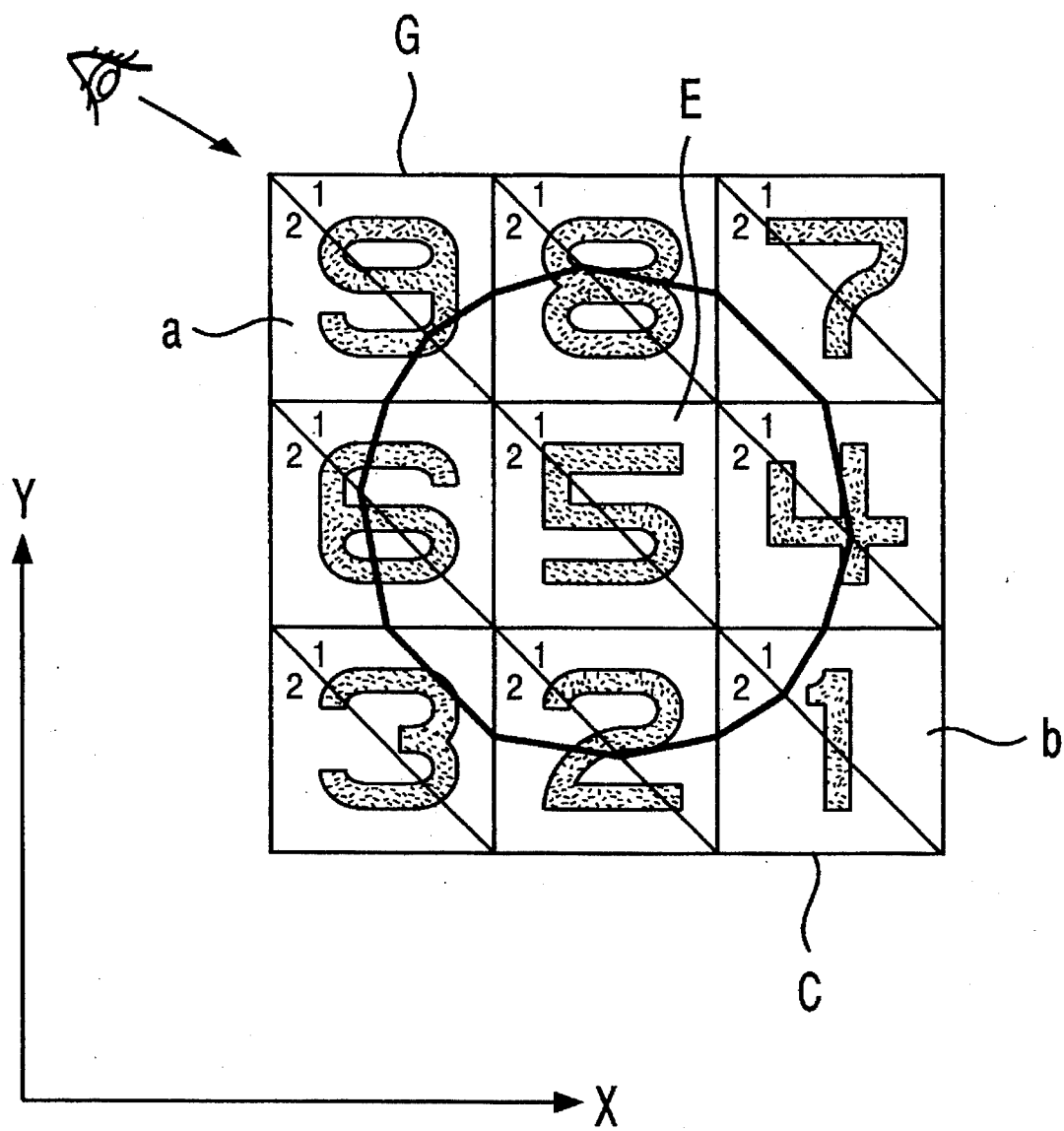

FIG. 13 shows the case in which the view vector is V=(2, −1). Since the inner product V·X=2>0 and V·Y=−1<0, the depth order in the X-direction is C→A, and the depth order in the Y-direction is A→G. Therefore, the depth order is shown by large numbers 1 to 9, as in FIG. 13. Attention is then given to rectangle E, for instance. After the position data of the centroids of triangles "a" and "b" contained there are obtained, the distance from the view point is obtained for each of the centroids. It is found that triangle "b" is further than triangle "a" by comparison of the distances. The depth order of triangles in one rectangle is common to all the rectangles. This is shown by the small numbers in FIG. 13. Accordingly, if polygonal data inside triangles are generated in the order C-b to G-a, and transferred to the display apparatus in order of generation, then hidden surface removal is automatically performed.

D3. Detailed of the process

Figure 14:
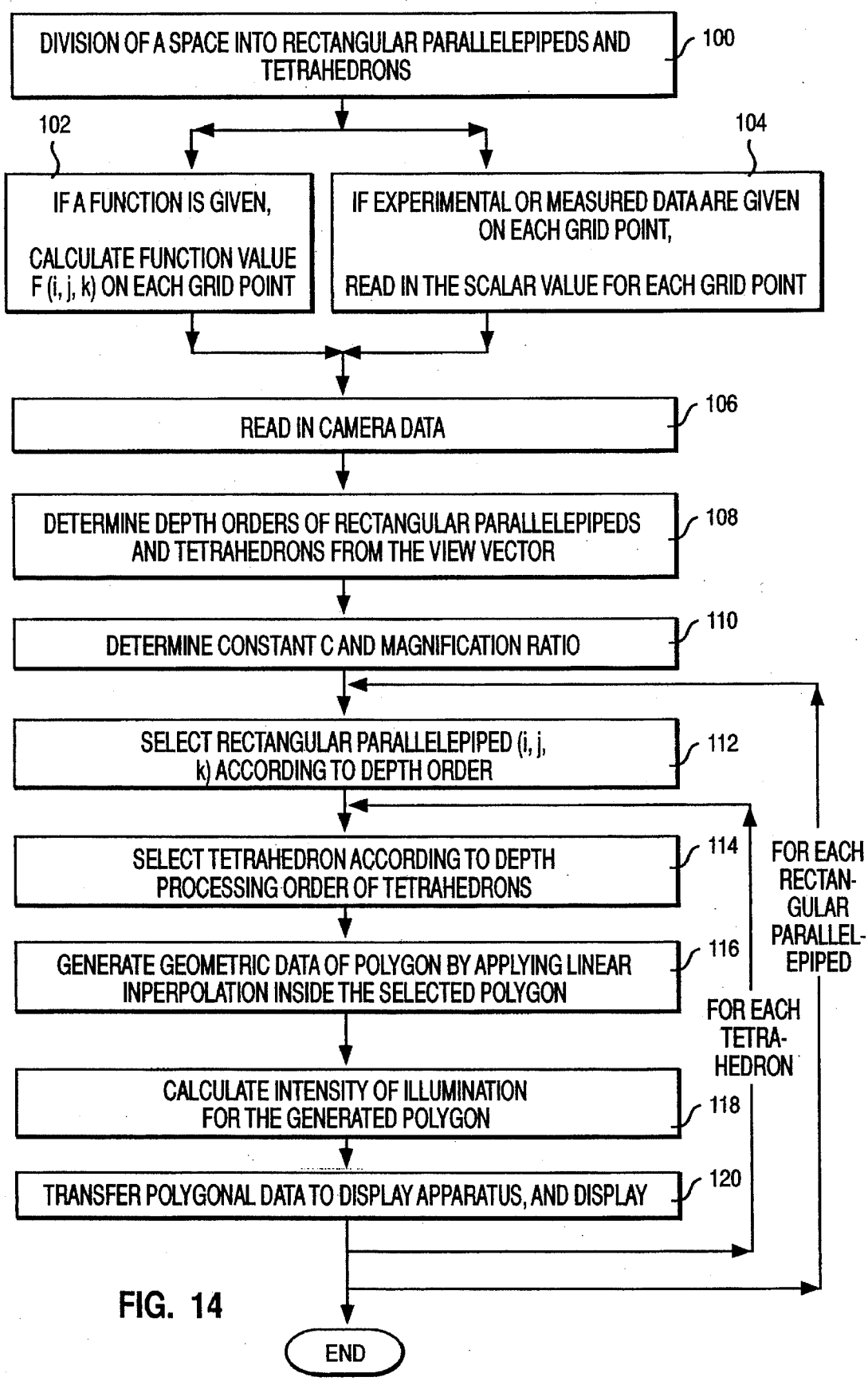
FIG. 14 is a flowchart for showing the tetrahedral grid method to which the present invention is applied.

A series of steps for generating and displaying a 3object by applying the 3D object processing of the present invention to the tetrahedral grid method is described with reference to FIG. 14.

Steps 100 to 104 are executed as already explained above in D1. In step 106, the position data of a view point and a reference point are provided through an appropriate input device and data of the view vector V are then generated.

This calculation is performed according to the equation $$V = I - E$$

where E represents the world coordinates (xe, ye, ze) of the view point, and I the world coordinates (xi, yi, zi) of the reference point.

Data on the screen size are simultaneously specified in this step.

In step 108, the depth orders of the rectangular parallelepipeds and tetrahedrons are determined according to the following sub-steps. The arrangement direction vectors, namely, the grid axis vectors for the rectangular parallelepipeds, are represented by I, J, and K (see FIG. 3). The view vector is represented by V. Each rectangular parallelepiped is assumed to be divided into tetrahedrons T1 to T5 (see FIG. 5).

Sub-step 1

Normalize vectors I, J, and K.

Sub-step 2

Calculate the inner products V·I, V·J, and V·K.

Sub-step 3

Figure 15:
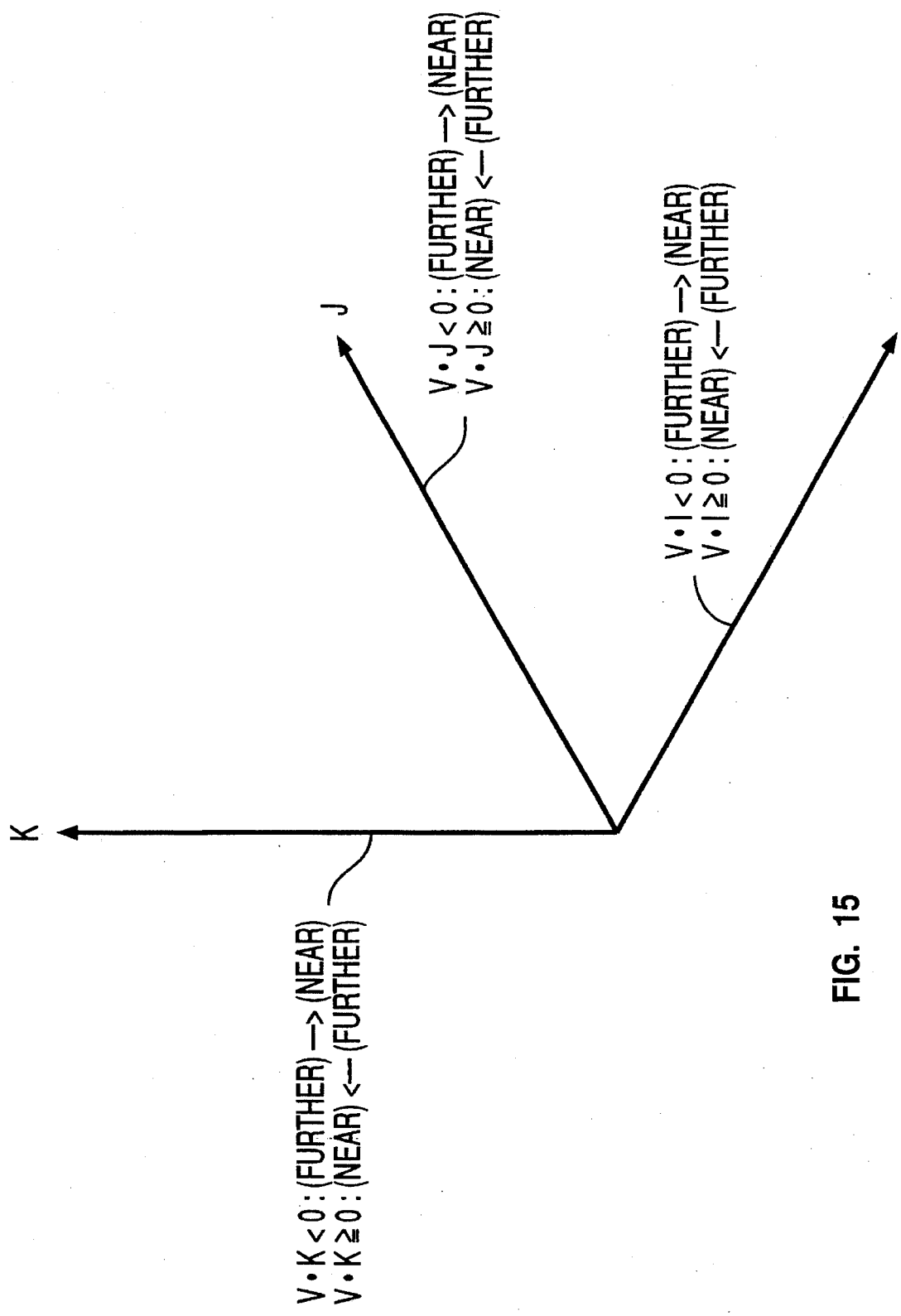
FIG. 15 illustrates the step of determining the depth order of tetrahedrons.

From the signs of the inner products V·I, V·J, and V·K, determine the parameter values for DO statements for processing rectangular parallelepipeds (see step 112). If the sign is negative, each index is increased from 1 successively, and if positive (or 0), it is decreased from the number of grids successively (see FIG. 15). This is described in a FORTRAN language style as follows:

```
integer*4    i1, i2, idecr,
             j1, j2, jdecr,
             k1, k2, kdecr;
    ....
    ....

if(VI < 0.0)   {i1 = 1; i2 = Imax: idecr = 1;}
else           {i1 = Imax; i2 = 1; idecr = -1;} if(VJ < 0.0)   {j1 = 1; j2 = Jmax: jdecr = 1;}
else           {j1 = Jmax; j2 = 1; jdecr = -1;} if(VK < 0.0)   {k1 = 1; k2 = Kmax: kdecr = 1;}
else           {k1 = Kmax; k2 = 1; kdecr = -1;}
```

Thus, the depth order of rectangular parallelepipeds is represented by the values of parameters i1, i2, idecr, j1, j2, jdecr, k1, k2, and kdecr for the DO statements (see step 112) in this embodiment. If the value of the depth order of each rectangular parallelepiped is stored for Imax=Jmax=Kmax=100, for instance, a memory of 4M(=100*100*100*4) bytes is required. In contrast, the memory amount required to store depth order is only 36(=9*4) bytes in this embodiment.

Sub-step 4

The centroid position data for tetrahedrons T1 to T5 contained in one of the rectangular parallelepipeds, which may be selected arbitrarily, are generated with reference to the rectangular parallelepiped-tetrahedron list and the tetrahedron-vertex list. Then the distance D from the view point is calculated for each centroid. The depth order of tetrahedrons T1 to T5 is determined on the basis of the distance D. This order is common to tetrahedrons T1 to T5 in all the rectangular parallelepipeds.

In sub-steps 3 and 4, the depth orders of the rectangular parallelepipeds and tetrahedrons, and thus their processing orders, have been determined. These orders can be repeatedly utilized as long as the view vector direction remains unchanged, irrespective of the change in the magnification ratio of an image to be displayed or the constant C of an equi-valued surface, which are determined by the user in step 110.

In step 112, a rectangular parallelepiped (i,j,k) is selected, for example by the DO loop shown below.

```
do 10 i=i1,i2,idecr
        do 20 j=j1,j2,jdecr
                do 30 k=k1,k2,kdecr
                    Process rectangular parallelepiped (i,j,k).
30              continue
20      continue
10 continue
```

The processing of the rectangular parallelepiped (i,j,k) means execution of steps 114 to 120 for each tetrahedron.

In step 114, tetrahedrons T1 to T5 are sequentially selected for processing according to the tetrahedron depth order determined in sub-step 4 of step 108.

In step 116, geometric data of at most one polygon are generated for the selected tetrahedron as stated in D.1. In step 118, the intensity of illumination is calculated for the generated polygon as stated in D.1. The generated polygonal data are transferred successively to the display apparatus (step 120). Accordingly, it is not necessary to maintain geometric data with coordinates transformed in an area of memory. Since polygonal data are transferred to the display apparatus in order of depth from the view point, hidden surface removal is carried out automatically.

In the display of transparent equi-valued surfaces, it is necessary to add to the pixel value that was previously written in a frame buffer the color of a polygon whose data will later be transferred.

In accordance with the algorithm described above, high-speed 3D object processing can be done in order of the depth of polygons without depth calculation. In fact, various opaque or semi-transparent equi-valued surfaces are often displayed interactively in the analysis of simulation results. This algorithm is especially effective for such applications.

D4. Example of hardware configuration

Figure 16:
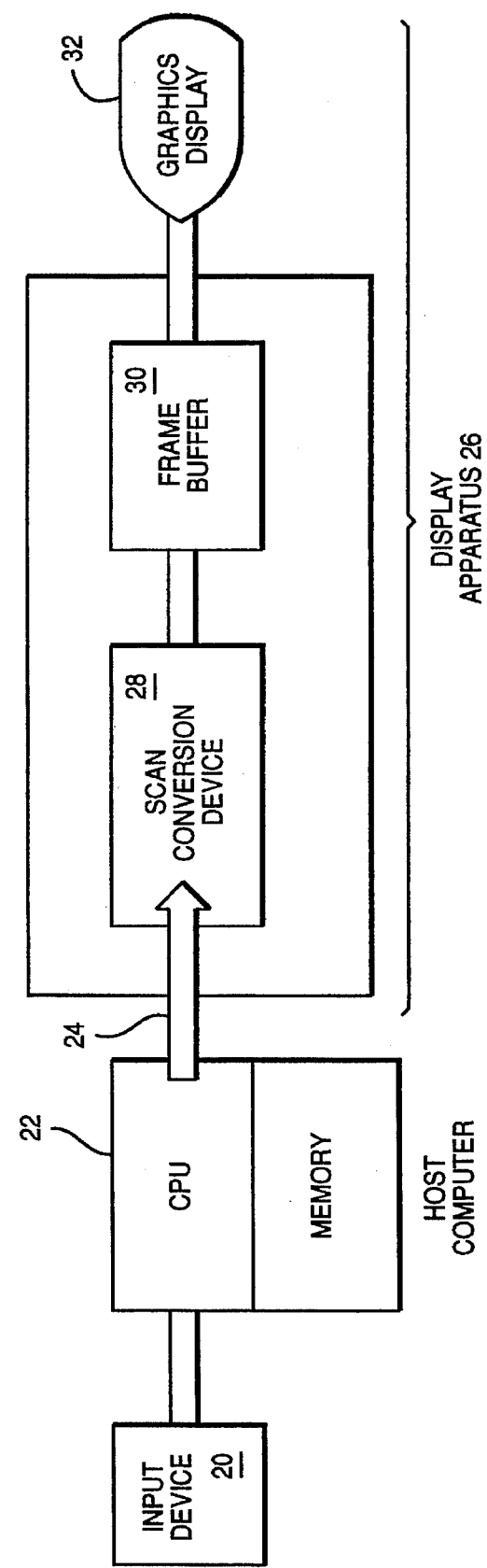
FIG. 16 is a schematic diagram showing how the system can be used to display 3D objects according to the present invention.

An example of the hardware configuration of a 3D graphics display system made in accordance with the present invention is described with reference to FIG. 16. In response to the data of a view point and a reference point inputted from an input device 20 such as a keyboard, polygonal data are generated by a host computer 22. The generated polygonal data are sent to a display apparatus 26 over a high-speed bus 24. In the display apparatus 26, coordinate transformation from the world coordinate system to the screen coordinate system is performed immediately by a scan conversion device 28. Polygonal data with coordinates transformed are written into a frame buffer 30 for a graphics display 32. The frame buffer 30 may be of a look-up table type or a full color type of 24 bits (8 bits each of red, green and blue). No z-buffer is required in the present invention.

D5. Other embodiments

In the above example, the generated polygonal data are transferred to a display apparatus without being stored. The memory requirement is reduced by such 3D object processing, which can be performed in order of the depth of polygons without temporal storage of polygonal data in an area of memory. However, if polygonal data are stored in association with the tetrahedron containing that polygon, a 3D object processed in order of the depth of polygons can be displayed only by determining the depth orders of rectangular parallelepipeds and tetrahedrons in response to a change in the view vector, and transferring the polygonal data to the display apparatus in the determined order.

Figure 17:
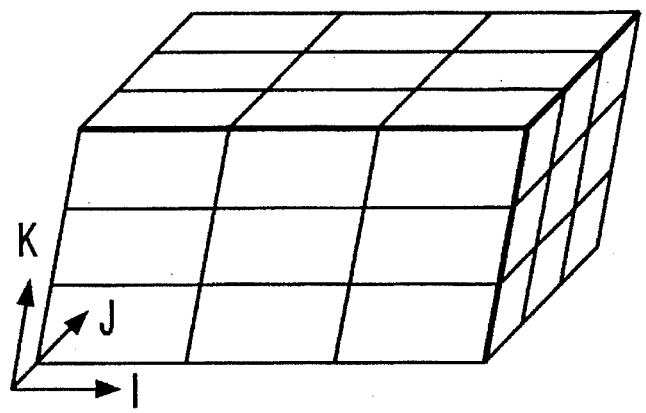
FIGS. 17 and 18 show examples of the division of a space into rectangular parallelepipeds.

Furthermore, the present invention can be applied in the following cases:

The grid axes are not orthogonal, and thus a space is divided into parallelepipeds other than rectangular parallelepipeds (see FIG. 17).

Figure 18:
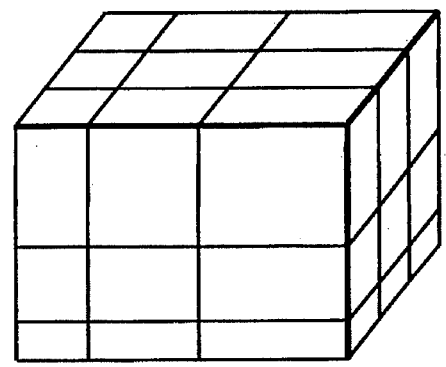

The density of grid points distributed in a space is not uniform, and hence the size of the generated rectangular parallelepipeds is not fixed (see FIG. 18).

If the number of grid points is very large, the present invention can be implemented even on a computer with a small virtual memory, by roughly dividing the grid space into small spaces, and applying the present invention to each small space.

Figure 19:
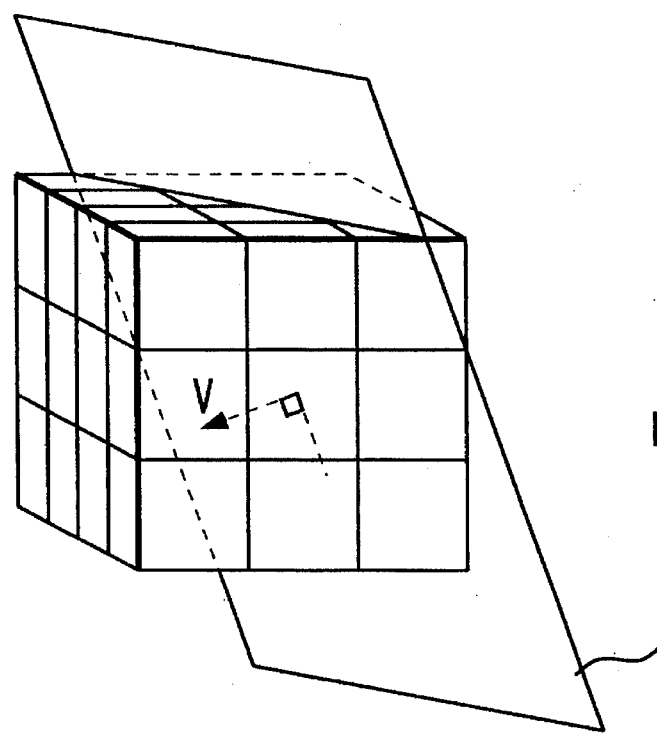
FIG. 19 shows 3D object processing when the view point is within the grid space.

Moreover, the present invention can also be applied even if the view point is within the grid space. In that case, however, only the polygonal data clipped by a plane S perpendicular to the view vector and containing the view point are transferred to the display apparatus, as shown in FIG. 19.

Of course, the present invention can be applied even if the function F or the constant C in equation (1) expressing the surface of a 3D object to be displayed varies from place to place.

Further, the present invention can also be applied to a method other than the tetrahedral grid method if it divides a three-dimensional space into a plurality of elements arranged according to predetermined directions and generates graphics data of polygons in each element in order to display a 3D object.

E. Advantages of the invention

In accordance with the present invention, a 3D object can be displayed at a high speed by using data on polygons, which are processed in order of depth for each viewing ray.

We claim:

1. A method for displaying a three-dimensional (3D) object on a computer display device wherein a three-dimensional space is virtually divided into a plurality of elements arranged according to predetermined directions, said predetermined directions being expressed as a set of unit direction vectors, graphics data representing zero, one or more polygons is generated for each element, and said 3D object is displayed by using the generated graphics data, the method comprising the steps of:

(a) receiving a set of view point position coordinates and a set of reference point position coordinates and generating data for a view vector connecting the view point position coordinates and the reference point position coordinates;

(b) determining a depth order for said plurality of elements based on the inner products of the view vector data and the direction vectors representing the predetermined directions of said elements without testing individual elements; and (c) transferring the generated graphics data representing polygons to a display apparatus in order of the depth order of said plurality of elements and said arrangement according to predetermined directions.

2. A method for displaying a three-dimensional (3D) object, wherein a three-dimensional space is virtually divided into a plurality of elements arranged according to predetermined directions, said predetermined directions represented by a set of unit direction vectors, each of said elements is virtually divided into an equal number of sub-elements having equivalent sub-element positional relationships in all the elements, graphics data of at most one polygon are generated in each sub-element, and a 3D object is displayed on the basis of the generated graphics data of the polygons, the method comprising the steps of:

(a) receiving a set of view point position coordinates and a set of reference point position coordinates, and generating data for a view vector connecting the view point position coordinates and the reference point position coordinates;

(b) determining a depth order of said plurality of elements on the basis of the inner products of the view vector data and the direction vectors representing the predetermined directions of said elements without testing individual elements;

(c) determining a depth order for each of said plurality of sub-elements within one of said plurality of elements, said order being commonly applicable to all the elements, by comparing the sub-element positional relationships of each sub-element contained in the element to the view point position; and (d) transferring the generated graphics data representing polygons to a display apparatus in order of the depth order of said plurality of elements, the arrangement according to predetermined directions, and of said plurality of sub-elements with each of said elements.

3. A method for displaying a 3D object as set forth in claim 2 wherein said elements are rectangular parallelepipeds, and said sub-elements are tetrahedrons, each of which is spanned by four vertices of the rectangular parallelepipeds.

4. A method for displaying a 3D object as set forth in claim 2 wherein in said step (b), an inner product having a sign and a value is calculated between said view vector and each of the direction vectors of said elements, and the depth order of said elements is determined on the basis of the signs of the inner products.

5. A method for displaying a 3D object as set forth in claim 2 wherein in step (b), the depth order of said plurality of elements is represented by a plurality of parameters for control statements of a repetitive loop that performs element selection for generating polygon data.

6. A method for displaying a 3D object as set forth in claim 2 wherein in step (c), comparing the positional relationships comprises the steps of generating position data of a representative point for each of the sub-elements in one element, calculating a distance from the view point position coordinates to the representative points, and specifying the depth order of said sub-elements according to the calculated distances.

7. A method for displaying a 3D object as set forth in claim 6 wherein said representative points are centroids of the sub-elements.

8. A system for displaying a three-dimensional (3D) object wherein a three-dimensional space is virtually divided into a plurality of elements arranged according to predetermined directions, said predetermined directions being expressed as a set of unit direction vectors, graphics data representing zero, one or more polygons is generated in each element, and a 3D object is displayed on the basis of the generated graphics data, the system comprising:

(a) means for generating data for a view vector connecting a given view point position coordinate and a reference point position coordinate;

(b) means for determining a depth order of said plurality of elements based on the inner products of the view vector data and the direction vectors representing the predetermined directions of said elements without testing individual elements; and (c) means for transferring the generated graphics data representing polygons to a display apparatus in order of the depth order of said plurality of elements and the predetermined arrangement order.

9. A system for displaying a three-dimensional (3D) object wherein a three-dimensional space is virtually divided into a plurality of elements arranged in predetermined directions, said predetermined directions represented by a set of unit direction vectors, each of said elements is virtually divided into an equal number of sub-elements having equivalent sub-element positional relationships in all the elements, graphics data of at most one polygon are generated in each sub-element, and a 3D object is displayed on the basis of the generated graphics data of polygons, the system comprising:

(a) means for generating data for a view vector connecting a given view point position coordinate set and a reference point position coordinate set;

(b) means for determining the depth order of said plurality of elements on the basis of the inner products of the view vector data and the direction vectors representing the predetermined directions of said elements without testing individual elements;

(c) means for determining the depth order of sub-elements within an element, which is commonly applicable to all the elements, by comparing the sub-element positional relationships of each sub-element contained in the element to the view point position; and (d) means for transferring the generated graphics data of polygons to a display apparatus in order of the depth order of said plurality of elements, the predetermined arrangement, and the depth order of said plurality of sub-elements within one element.

10. A system for displaying a 3D object as set forth in claim 9 wherein said elements are rectangular parallelepipeds, and said sub-elements are tetrahedrons spanned by four vertices of the rectangular parallelepipeds.

11. A system for displaying a 3D object as set forth in claim 9 wherein said means (b) includes calculation means for calculating an inner product having a sign and a value based on said view vector data and each of the direction vectors of said elements, and means for determining a depth order of said plurality of elements on the basis of the signs of the inner products.

12. A system for displaying a 3D object as set forth in claim 9 wherein said means (b) includes means for determining a depth order of said plurality of elements represented by a plurality of parameters for control statements of a repetitive loop that performs element selection for generating polygonal data.

13. A system for displaying a 3D object as set forth in claim 9 wherein said means (c) includes means for generating data on the position of a representative point for each of the sub-elements in one element, means for calculating the distance from the view point position to each of the representative points, and means for determining a depth order of said sub-elements according to the calculated distances.

14. A system for displaying a 3D object as set forth in claim 13 wherein said representative points are centroids of the sub-elements.

* * * * *